United States Patent
Oswald

(10) Patent No.: US 10,044,300 B2
(45) Date of Patent: Aug. 7, 2018

(54) METHOD FOR SUPPLYING POWER TO AN ELECTRIC MOTOR, ASSOCIATED COMPUTER PROGRAM, INVERTER CONTROL DEVICE AND ELECTRICAL ROTATING MACHINE

(71) Applicant: Valeo Systemes de Controle Moteur, Cergy Saint Christophe (FR)

(72) Inventor: Dominique Oswald, Houilles (FR)

(73) Assignee: Valeo Systemes de Controle Moteur, Cergy Saint Christophe (FR)

( * ) Notice: Subject to any disclaimer, the term of this patent is extended or adjusted under 35 U.S.C. 154(b) by 156 days.

(21) Appl. No.: 14/785,562

(22) PCT Filed: Apr. 18, 2014

(86) PCT No.: PCT/FR2014/050953
§ 371 (c)(1),
(2) Date: May 6, 2016

(87) PCT Pub. No.: WO2014/170619
PCT Pub. Date: Oct. 23, 2014

(65) Prior Publication Data
US 2017/0179858 A1   Jun. 22, 2017

(30) Foreign Application Priority Data

Apr. 19, 2013  (FR) ...................... 13 53575

(51) Int. Cl.
*H02P 1/04*  (2006.01)
*H02P 6/14*  (2016.01)
*H02P 27/06*  (2006.01)

(52) U.S. Cl.
CPC ............... *H02P 6/14* (2013.01); *H02P 27/06* (2013.01)

(58) Field of Classification Search
CPC ........... H02P 21/24; H02P 27/06; G05B 11/28
See application file for complete search history.

(56) References Cited

U.S. PATENT DOCUMENTS

| 4,546,294 A | 10/1985 | Ban et al. |
| 2004/0104637 A1 | 6/2004 | Dube et al. |
| 2012/0217849 A1* | 8/2012 | Aoki ........................ H02P 6/18 310/68 D |

FOREIGN PATENT DOCUMENTS

| EP | 0387358 A1 | 9/1990 |
| EP | 0511392 A1 | 11/1992 |

(Continued)

OTHER PUBLICATIONS

International Search Report issued in PCT/FR2014/050953 dated Sep. 5, 2014 (3 pages).

(Continued)

*Primary Examiner* — Karen Masih
(74) *Attorney, Agent, or Firm* — Osha Liang LLP

(57) ABSTRACT

A method of supplying electrical power to an electric motor including phases having respective directions about a rotation axis of the electric motor and configured to carry respective phase currents defining a current vector starting from the rotation axis, the method including: switching connection of the phases to a voltage source so as to cause the current vector to turn, where the switched connection of the phases includes, during at least one turn of the current vector, for each of one or more phases: over a part of the turn, disconnecting the phase from the voltage source to open circuit the phase, and over another part of the turn, switching connection of the phase to the voltage source, and where a perpendicular to the direction of the phase passes through the part of the turn over which the phase is disconnected from the voltage source.

9 Claims, 8 Drawing Sheets

(56) References Cited

FOREIGN PATENT DOCUMENTS

| | | |
|---|---|---|
| EP | 1139558 A1 | 10/2001 |
| FR | 2 938 711 A1 | 5/2010 |
| FR | 2944391 A1 | 10/2010 |
| FR | 2974466 A1 | 10/2012 |

OTHER PUBLICATIONS

Written Opinion of the International Searching Authority issued in PCT/FR2014/050953 dated Sep. 5, 2014 (4 pages).

* cited by examiner

METHOD FOR SUPPLYING POWER TO AN ELECTRIC MOTOR, ASSOCIATED COMPUTER PROGRAM, INVERTER CONTROL DEVICE AND ELECTRICAL ROTATING MACHINE

The present invention concerns a method for supplying power to an electric motor, an associated computer program, an inverter control device and an electrical rotating machine.

The published French patent application FR 2 974 466 describes a method of supplying electrical power to an electric motor including phases having respective directions about a rotation axis of the electric motor and intended to carry respective phase currents defining a current vector starting from the rotation axis, the method including the switched connection of the phases to a voltage source so as to cause the current vector to turn.

To execute this method, a control device is generally adapted to control an inverter so that the latter carries out switching operations applying voltages to each phase alternately, for example the voltage supplied by the direct current voltage source and its opposite.

As the phases of the electric motor are independent, the sum of the phase currents is not forced to zero and so a homopolar current can appear. Now, in a classic multiphase machine, magnetic coupling between the phases opposes a very low impedance to this homopolar current, so that a high level of ripple appears. This ripple does not participate in the creation of a rotating magnetic field driving the rotor of the motor and is therefore unwanted.

Reducing such ripple may therefore be required. Moreover, reducing losses caused by switching operations in the inverter may also be required.

In order to solve the foregoing problem at least in part, there is proposed a method of supplying electrical power to an electric motor, including phases having respective directions about a rotation axis of the electric motor and intended to carry respective phase currents defining a current vector starting from the rotation axis, the method including:
  the switched connection of the phases to a voltage source so as to cause the current vector to turn,
the method being characterized in that the switched connection of the phases includes, during at least one turn of the current vector, for each of one or more phases:
  over a part of the turn, the disconnection of the phase from the voltage source to open circuit the phase, and
  over the other part of the turn, the switched connection of the phase to the voltage source.

Optionally, the steps of disconnection over a part of the turn and of connection for the other part of the turn are applied to all the phases of the electric motor.

Also optionally, the perpendicular to the direction of the phase passes through the part of the turn over which the phase is disconnected from the voltage source.

Also optionally, the part of the turn over which the phase is disconnected from the voltage source includes two separate sub-parts through each of which passes the perpendicular to the direction of the disconnectable phase.

Also optionally, only one phase is disconnected to open circuit it at a time.

Also optionally, the method further includes, for disconnecting each of at least one phase over a part of a turn and for switchedly connecting this phase or each of the phases over the other part of the turn:
  the reception of measurements of the phase currents,
  the determination of the current vector corresponding to the measured phase currents belonging to at least one predetermined angular sector associated with a phase,
  the disconnection of each phase associated with the predetermined angular sector or sectors to which the current vector belongs, and
  the switched connection of the other phase or phases.

Also optionally, the method further includes for disconnecting each of at least one phase over a part of a turn and for switchedly connecting this phase or each of these phases over the other part of the turn:
  the reception of a set point current vector,
  the determination of the set point current vector belonging to at least one predetermined angular sector associated with a phase,
  the disconnection of each phase associated with the predetermined angular sector or sectors to which the set point current vector belongs, and
  the switched connection of the other phase or phases.

Also optionally, the method further includes for disconnecting each of at least one phase over a part of a turn and for switchedly connecting this phase or each of these phases over the other part of the turn:
  the measurement of the phase currents,
  the detection of the cancellation or non-cancellation of a phase current,
  if a phase current has been cancelled, the disconnection of the phase for which the phase current has been cancelled, if not, the disconnection of the last phase for which the phase current was cancelled, and
  the switched connection of the other phase or phases to the voltage source.

There is also proposed a computer program containing lines of code which, when executed by a computer, provoke the control by the computer of an inverter connecting an electric motor to a voltage source so as to implement a method according to the invention.

There is also proposed a control device of an inverter connecting an electric motor to a voltage source, the electric motor including phases having respective directions about a rotation axis of the electric motor and intended to carry respective phase currents defining a current vector starting from the rotation axis, the control device being intended to control the inverter so that the latter effects a switched connection of the phases to the voltage source so as to cause the current vector to turn, characterized in that the control device is further configured as follows, during at least one turn of the current vector, for each of one or more phases:
  over a part of the turn, to control the inverter so that the latter effects the disconnection of the phase from the voltage source to open circuit the phase, and
  over the other part of the turn, to control the inverter so that the latter effects the switched connection of the phase to the voltage source.

There is also proposed an electrical rotating machine including:
  an electric motor including phases having respective directions about a rotation axis of the electric motor and intended to carry respective phase currents defining a current vector starting from the rotation axis,
  a voltage source,
  an inverter adapted to connect the voltage source to the phases of the electric motor,
  a control device in accordance with the invention.

Embodiments of the invention are described next with reference to the appended figures, in which:

FIG. 1 shows an electrical rotating machine in accordance with a first embodiment of the invention, FIG. 2 is a diagram of angular sectors over one turn of a current vector defined in the rotating machine from FIG. 1, FIG. 3 is a flowchart of a method of supplying electrical power used in the rotating machine from FIG. 1, FIGS. 4 to 7 are set point phase current and phase current graphs to illustrate the reduction of unwanted ripple, and FIGS. 8 to 10 are flowcharts of methods of supplying electrical power used in other embodiments of the invention.

First Embodiment

FIG. 1: Electrical Rotating Machine 100

An electrical rotating machine 100 in accordance with the invention is described next with reference to FIG. 1. In the example described, the rotating machine 100 is used to drive a rotor in rotation from a voltage source (motor function), but the invention encompasses electrical generators, in which case the rotating machine is intended to supply electricity to the voltage source by virtue of the rotation of the rotor.

Voltage Source 102

The electrical rotating machine 100 firstly includes a voltage source 102 intended to supply a direct current voltage E relative to an electrical ground M.

Electric Motor 104

The electrical rotating machine 100 further includes an electric motor 104. The electric motor 104 includes a stator and a rotor intended to turn relative to the stator about a rotation axis A. The electric motor 104 further includes three phases u, v, w having directions equally distributed in a plane transverse to the rotation axis A and therefore separated from one another by 120° in this transverse plane. Each phase u, v, w has two limits. The phases u, v, w are independent, i.e. are not connected together by one of their terminals. The phases u, v, w are intended to carry respective phase currents $i_u$, $i_v$, $i_w$. These phase currents $i_u$, $i_v$, $i_w$ define a current vector i in the plane transverse to the rotation axis A and perpendicular to the rotation axis A. To be more precise, each phase current $i_u$, $i_v$, $i_w$ defines a phase vector having, on the one hand, by way of direction, the direction of the phase u, v, w that it flows in and, on the other hand, by way of a norm, the value of this phase current $i_u$, $i_v$, $i_w$. The current vector i is then defined as the vector sum of the phase vectors. This current vector i follows the rotation of the rotor and therefore makes it possible to represent the position of the rotor.

Inverter 106

The rotary drive system 100 further includes an inverter 106 intended to connect each phase u, v, w of the electric motor 104 to the direct current voltage source 102 in a switched manner. The inverter 106 is intended to connect or to disconnect in a switched manner each terminal of the phases u, v, w to or from the voltage E or to or from the ground M, so as selectively apply to each phase u, v, w the voltage +E, its opposite −E, a zero voltage, or to disconnect both terminals to open circuit the phase u, v, w and therefore to cut off the current in the phase u, v, w. The inverter includes in particular switches each connecting a terminal of the voltage source 102 to a terminal of a phase u, v, w. An H bridge is therefore produced for each phase u, v, w. In the embodiment described in which there are three phases u, v, w, the inverter 106 therefore includes three H bridges and twelve switches. Moreover, the inverter 106 includes a freewheel diode in parallel with each switch.

Sensor 108

The rotary drive system 100 further includes a sensor 108 intended to measure the phase currents $i_u$, $i_v$, $i_w$.

Control Device 110

The rotary drive system 100 further includes a control device 110 intended to control the inverter 106 so that the latter makes a switched connection of the phases u, v, w to the voltage source 102 so as to cause the current vector i to turn about the rotation axis A, causing the rotor to rotate relative to the stator.

In the embodiment described, the control device 110 is a computer (sometimes referred to as a "processor") including a memory 112 in which a computer program is stored and a processing unit 114 intended to execute the computer program. The latter includes instructions which, when executed by the control device 110, i.e. by the processing unit 114, cause the control device 110 to control the inverter 106 so as to execute the steps of the method of supplying electrical power to the electric motor 104 described hereinafter with reference to FIG. 3. Moreover, there is stored in the memory 112 at least one association between at least one predetermined angular sector and a predetermined phase. For example, each angular sector is represented in the memory 112 by the range of angles that it covers.

FIG. 2: Associations between Phases and Angular Sectors

The associations stored in the memory 112 are described next with reference to FIG. 2.

A turn of the current vector i is divided into six angular sectors $S1_u$, $S2_u$, $S1_v$, $S2_v$, $S1_w$ and $S2_w$ of the same angle π/3 and centered on the perpendiculars $P_u$, $P_v$, $P_w$ to the directions of the phases passing through the rotation axis A or in the plane of the phases. Each phase u, v, w is associated with the two opposite angular sectors $S1_u$, $S2_u$, or $S1_v$, $S2_v$, or $S1_w$, $S2_w$) through which passes the perpendicular $P_u$, $P_v$, $P_w$ to the direction of that phase u, v, w.

Thus the phase u is associated with the angular sectors $S1_u$ and $S2_u$, the phase v is associated with the angular sectors $S1_v$ and $S2_v$, and the phase w is associated with the angular sectors $S1_w$ and $S2_w$.

It will be appreciated that each angular sector $S1_u$, $S2_u$, $S1_v$, $S2_v$, $S1_w$, $S2_w$ extends as far as the two bisectors of the two angles between the perpendicular passing through that angular sector and the respective two adjacent perpendiculars. For example, the angular sector $S1_u$ extends between the bisector of the angle between the perpendicular $P_u$ and the perpendicular $P_v$ and the bisector of the angle between the perpendicular $P_u$ and the perpendicular $P_w$.

FIG. 3: Electrical Power Supply Method 300

A method 300 of supplying electrical power to the electric motor 104 is described next with reference to FIG. 3.

During a step 302, the control device 110 and the inverter 106 make the switched connection of the phases u, v, w to the voltage source 102 so as to cause the current vector i to turn through a large number of turns, for example more than 10 000 turns.

This step 302 includes the loop comprising the following steps.

During a step 304, the control device 110 receives the measured phase currents $i_u$, $i_v$, $i_w$ supplied by the sensor 108.

During a step 306, the control device 110 determines the current vector i from the measured phase currents $i_u$, $i_v$, $i_w$. In the embodiment described, the control device 110 determines the coordinates $i_X$, $i_Y$ of the current vector in an orthonormal system of axes X-Y.

During a step 308, the control device 110 receives a set point current vector i*. In the embodiment described, the set point current vector i* is represented by its coordinates $i_X^*$, $i_Y^*$ in the system of axes X-Y. Moreover, the set point current vector i* is "normal" i.e. does not take into account the disconnection of the phases to be described hereinafter.

During a step 310, the control device 110 determines the difference Δi between the current vector i and the set point current vector i*. In the embodiment described, the control device 110 determines the differences $\Delta i_x$, $\Delta i_y$ in the system of axes X-Y.

The following steps 312 and 314 are executed in parallel with the steps 304 to 310.

During a step 312, the control device 110 determines if the current vector i belongs to one of the angular sectors $S1_u$, $S2_u$, $S1_v$, $S2_v$, $S1_w$, $S2_w$ stored in the memory 102. To this end, the control device 110 determines the angle θ of the current vector i, for example, and compares it to the ranges of angles covered by the stored angular sectors.

During a step 314, the control device 110 determines that each phase associated with an angular sector to which the current vector i belongs is to be disconnected. The other phase or phases, i.e. that or those that have not been determined as being to be disconnected, is or are therefore determined as being "to be connected in switched manner". Accordingly, for each phase, when the current vector i belongs to an angular sector associated with that phase, the phase is to be disconnected, and, if the current vector i exits an angular sector associated with the phase, the latter is "reconnected", i.e. it becomes to be connected in switched manner. In the embodiment described, because the angular sectors do not overlap, only one phase at a time is to be disconnected. Each time that a phase becomes to be disconnected, the phase previously to be disconnected is "reconnected", i.e. it becomes to be connected in switched manner.

During a step 316, the control device 110 determines, for the phase or each of the phases that is or are not to be disconnected (i.e. the phase or phases that has or have been determined as being to be connected in switched manner), a set point phase voltage $U_u^*$, $U_v^*$ or $U_w^*$, for example from the difference Δi. In the embodiment described, the control device 110 therefore determines two set point phase voltages. For example, if the current vector i belongs to the angular sector $S1_u$ associated with the phase u, the control device 110 determines that the phase u is to be disconnected and determines the set point phase voltages $U_v^*$ and $U_w^*$.

During a step 318, the control device 110 determines a command C and transmits it to the inverter 106. The command C is intended to command the inverter 106 on the one hand to disconnect each phase to be disconnected and on the other hand to make the switched connection of each other phase to the voltage source 102 so as to apply (on average over time) the phase voltage set point determined for that phase. In the embodiment described, because the angular sectors do not overlap, only one phase is disconnected at a time. For example, if the phase u is to be disconnected, the command C is intended to command the inverter 106 to disconnect it.

During a step 320, the inverter 106 applies the command C and executes the commanded disconnection. Disconnection is reflected in particular in the opening of the switches at the terminals of the phase. If the phase to be disconnected has not been disconnected already, the phase current flows through the freewheel diodes until it is cancelled out and open circuits the phase (phase current remains zero).

If a phase to be disconnected has already been disconnected, effecting the disconnection means maintaining this disconnection and therefore maintaining the phase open circuit.

Accordingly, each phase u, v, w is disconnected from the voltage source 102 to open circuit it over a part of the turn corresponding to the angular sectors associated with that phase in the memory 112.

During the same step 324, the inverter 106 applies the command C and makes the required switched connection or connections, for example to apply different voltages alternately to each phase, for example the voltage +E, the voltage −E or the zero voltage (the two grounded terminals of the phase). Switching is effected at a high frequency, generally between 1 and 20 kHz.

Accordingly, each phase u, v, w is connected in switched manner to the voltage source 102 over the other part of the turn, i.e. that not corresponding to the angular sectors associated with that phase in the memory 112.

The method then returns to the step 304.

FIGS. 4 to 7: Explanation of Operation

In a simplified manner, the voltages $U_u$, $U_v$, $U_w$ at the terminals of the phases u, v, w and the phase currents $i_u$, $i_v$, $i_w$ are related by the following formula:

$$\begin{bmatrix} U_u \\ U_v \\ U_w \end{bmatrix} = \frac{d}{dt}\left(\begin{bmatrix} L+2M & -M & -M \\ -M & L+2M & -M \\ -M & -M & L+2M \end{bmatrix} \cdot \begin{bmatrix} i_u \\ i_v \\ i_w \end{bmatrix}\right)$$

where M is the magnetic coupling between two phases and L is the leakage inductance of a phase. In a conventional three-phase motor, L is much smaller than M, for example by a factor in the order of ten.

The relation between the voltages $U_u$, $U_v$, $U_w$ and the homopolar current (the sum of the three phase currents $i_u$, $i_v$, $i_w$) can also be written in the following manner:

$$(i_u + i_v + i_w) = \frac{1}{3L} \times \int (U_u + U_v + U_w)dt$$

If a phase, for example the phase w, is disconnected and open circuited, its phase current becomes zero and so the above formula becomes:

$$(i_u + i_v + 0) = \frac{1}{3L} \times \int (U_u + U_v + U_w)dt$$

Moreover, the voltage at the terminals of the disconnected phase is no longer forced by the inverter 106 but given by the following relation:

$$U_w = -\frac{d}{dt}(M(i_u + i_v))$$

Combining the foregoing two formulas produces a relation between the non-disconnected phase currents and the voltages at the terminals of these phases:

$$(i_u + i_v) = \frac{1}{3L+M} \times \int (U_u + U_v)dt$$

Because $i_u + i_v$ is not always zero, a homopolar current appears. This homopolar current is subjected to a high inductance having the value 3L+M, as against 3L if no phase disconnection were affected. M being approximately ten times greater than L, the inductance is therefore multiplied by a factor of 10/3 relative to the case with no phase disconnection.

Accordingly, disconnecting at least one phase firstly makes it possible to reduce the switching losses, because the switching operations corresponding to each disconnected phase are avoided. Moreover, thanks to the high inductance (3L+M), the unwanted ripple on the homopolar current is reduced.

Moreover, judiciously choosing the moments in the turn of the current vector i at which the phases are disconnected, limits the impact of the disconnections on the torque supplied by the electric motor 104. To be more precise, it has been noted that a phase u, v, w does not contribute to the torque if the current vector i is on the perpendicular $P_u$, $P_v$, $P_w$ to that phase passing through the rotation axis A, and very little about this perpendicular.

Second Embodiment

In a second embodiment, the set point current vector i* is used instead of the (measured) current vector i to determine the phase u, v, w to be disconnected.

Figure 1:
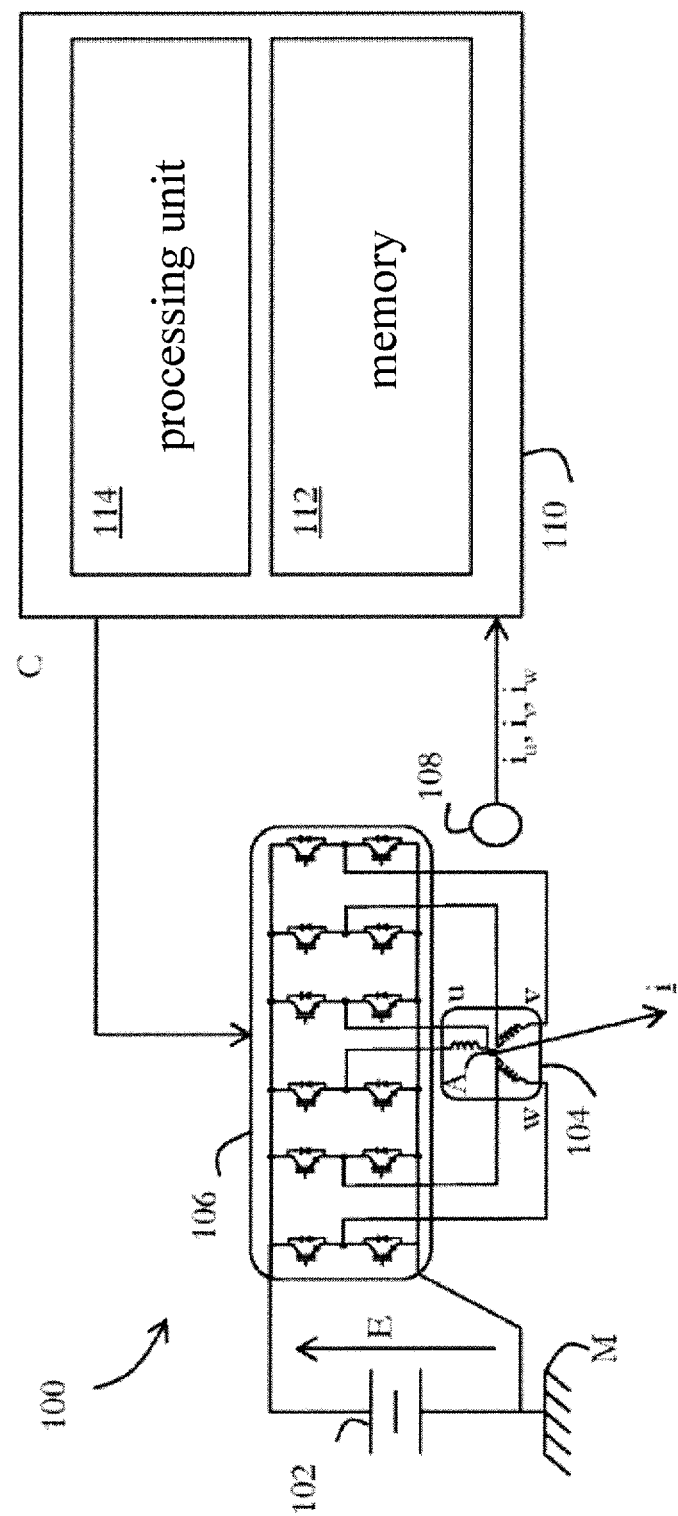

In this embodiment, the rotating machine 100 is identical to that from FIG. 1 except that the associations stored in the memory 112 associate with the phases the set point angular sectors (i.e. the ones intended to be compared to the set point current vector i* and not to the (measured) current vector i as in the first embodiment). In the embodiment described, the associations are identical to those shown in FIG. 2.

Figure 8:
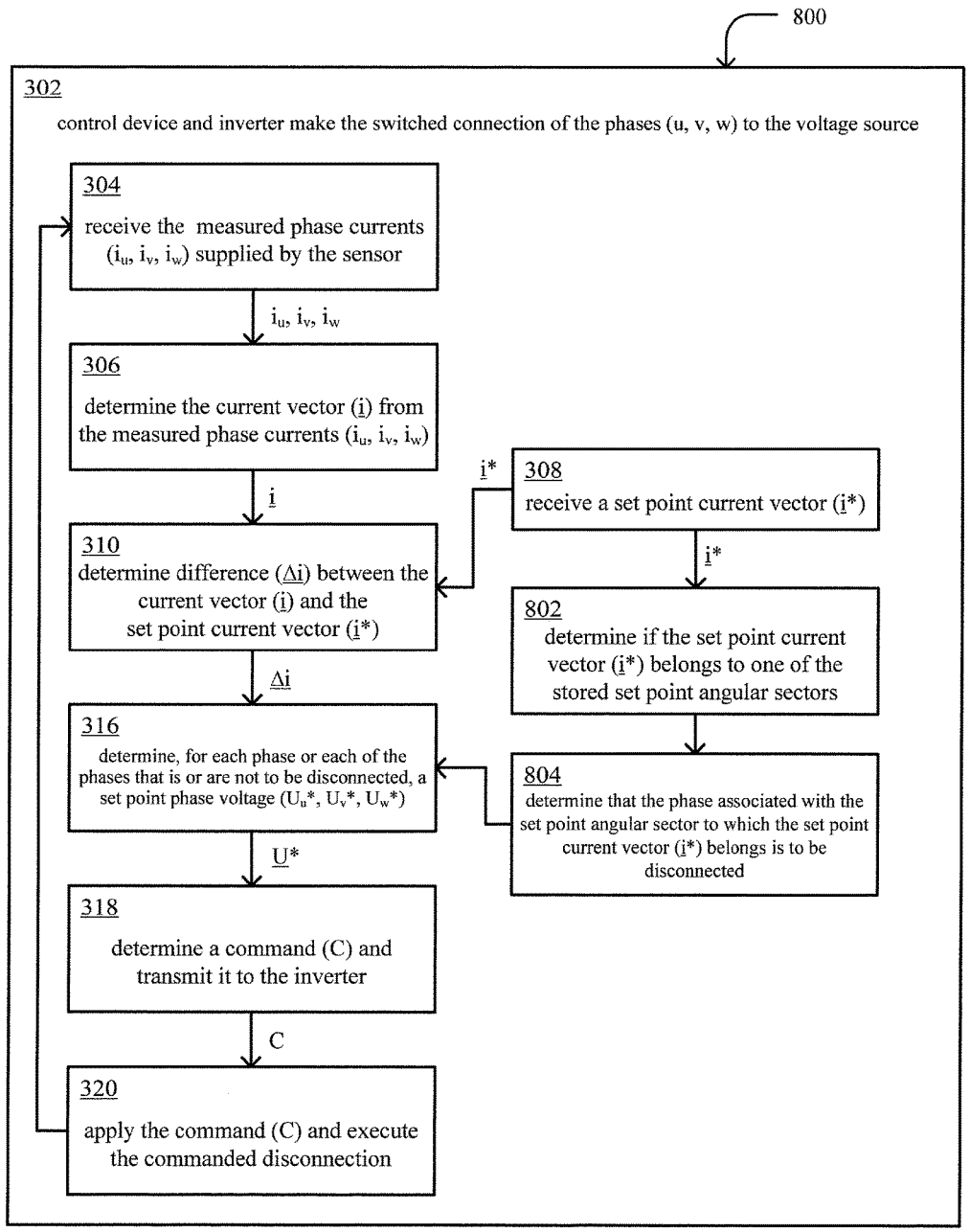

FIG. 8: Electrical Power Supply Method 800

Referring to FIG. 8, a method 800 of supplying electrical power to the electric motor 104 employed in the second embodiment is described next.

Figure 3:
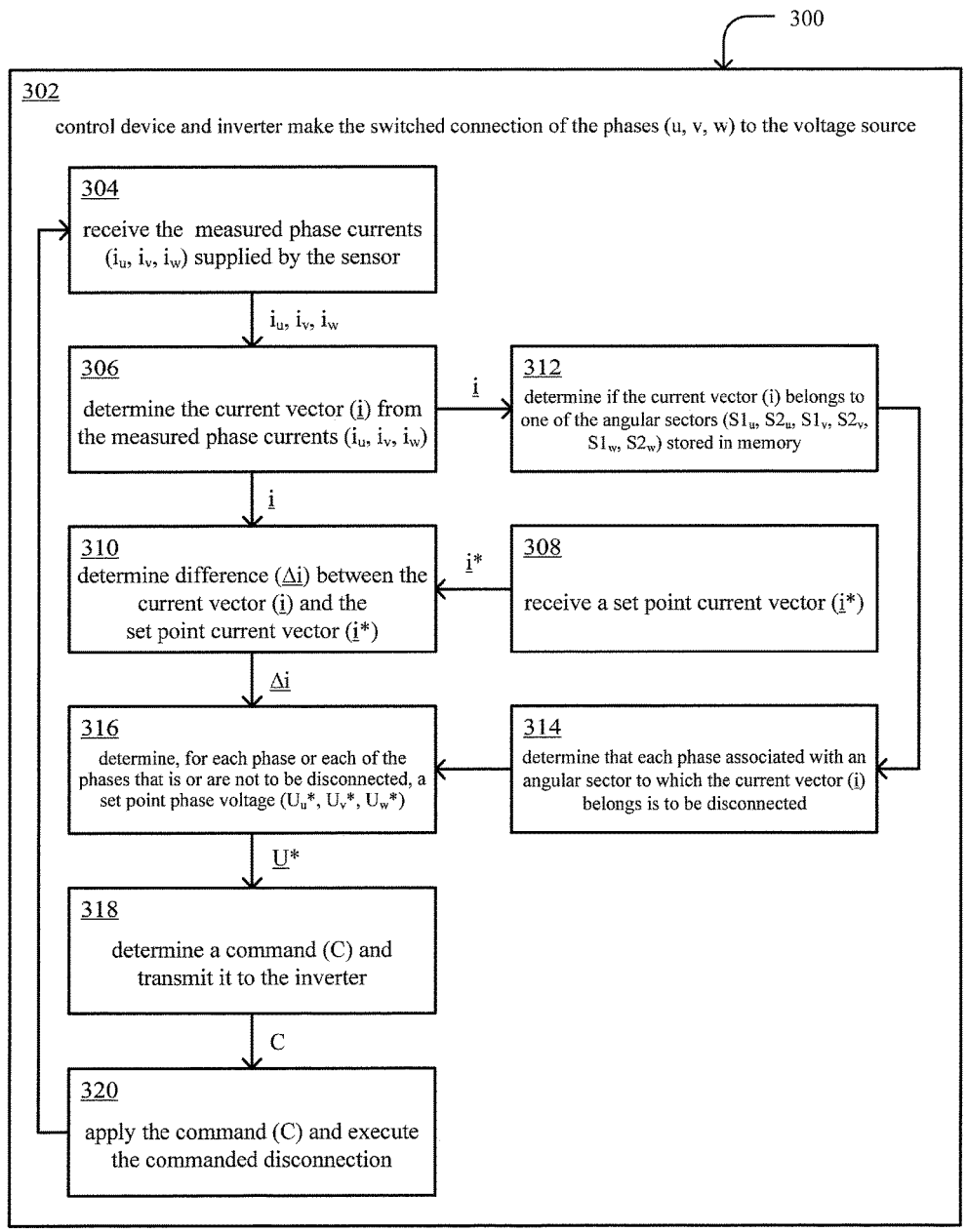
Figure 4:
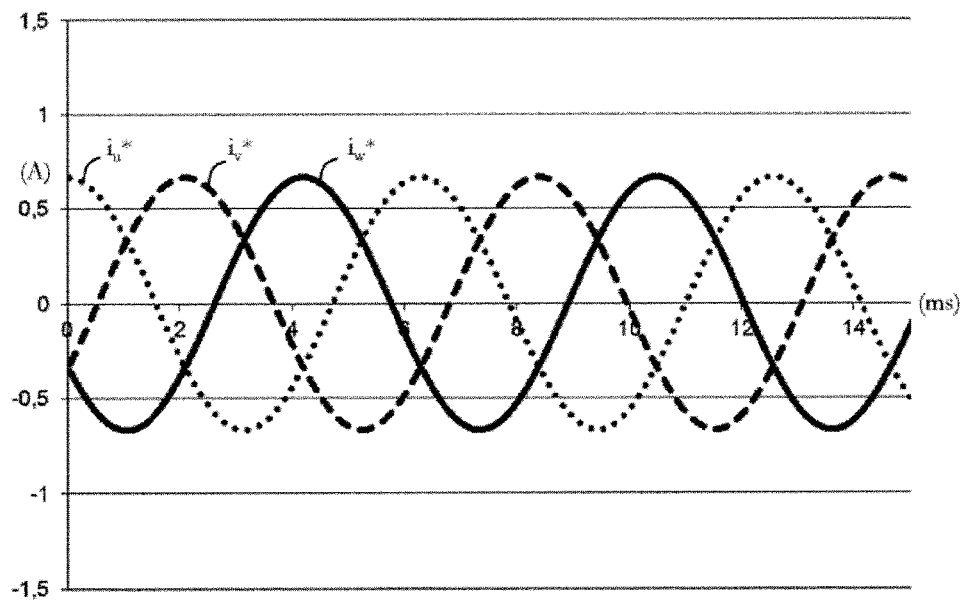
FIG. 4 shows the set point current vector i* in the form of set point phase currents $i_u$*, $i_v$*, $i_w$* for a constant torque. The set point phase currents $i_u$*, $i_v$*, $i_w$* are then sinusoidal and their relative phase is $2\pi/3$.
Figure 5:
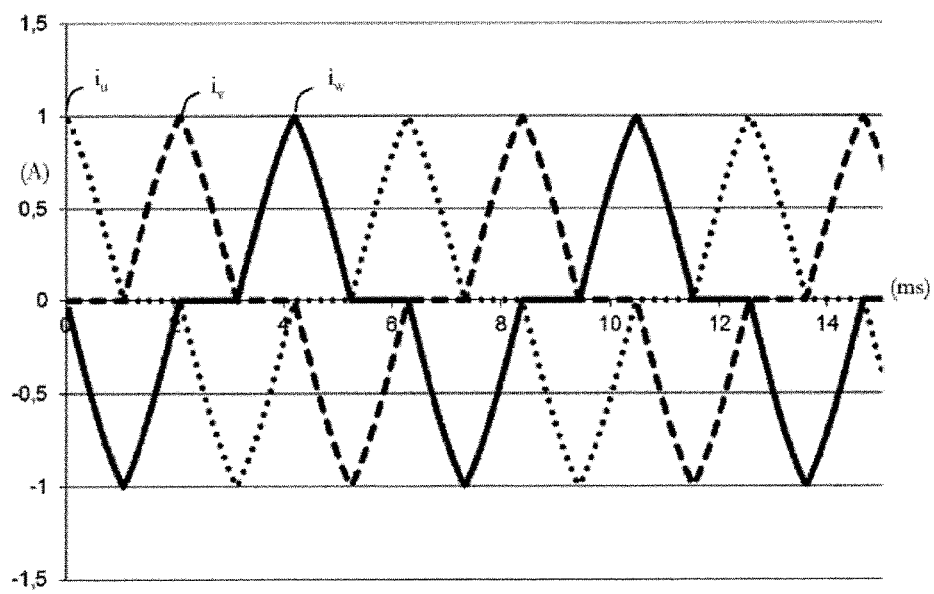
FIG. 5 shows the phase currents $i_u$, $i_v$, $i_w$ in the phases u, v, w. It will be appreciated that these phase currents feature zero current periods corresponding to the ranges of disconnection of the phase to open circuit it.
Figure 6:
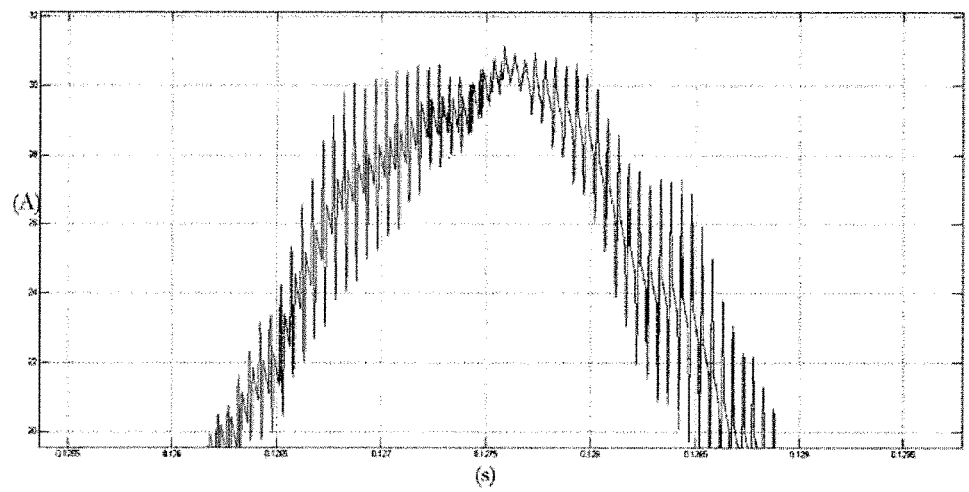
FIG. 6 shows the unwanted ripple on a phase current when no disconnection is effected (this is the usual situation).
Figure 7:
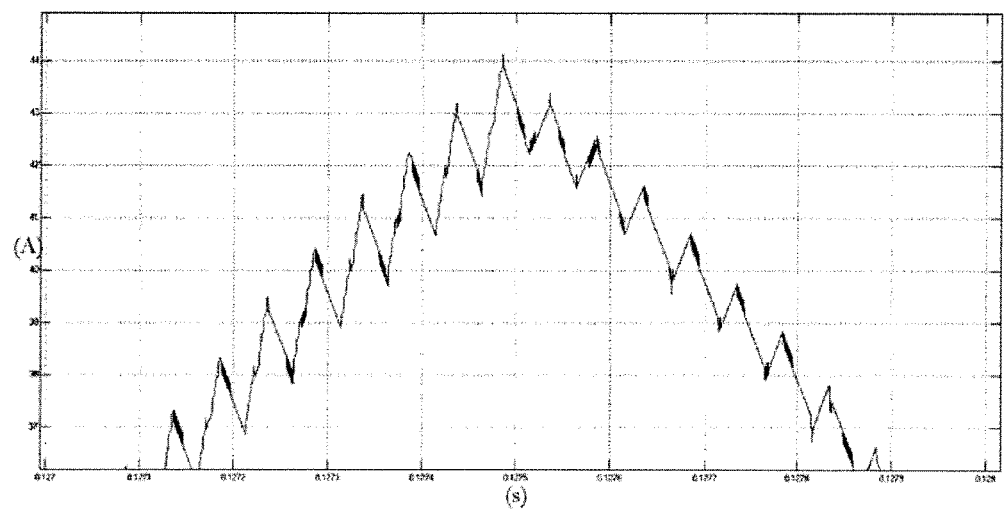
FIG. 7 shows the unwanted ripple on a phase current produced by a method in accordance with the invention. It will be appreciated that the amplitude of the ripple has indeed decreased.

The electrical power supply method 800 is identical to that from FIG. 3 except as follows.

The step 312 is replaced by a step 802 during which the control device 110 determines if the set point current vector i* belongs to one of the stored set point angular sectors.

The step 314 is replaced by a step 804 during which the control device 110 determines that the phase associated with the set point angular sector to which the set point current vector i* belongs is to be disconnected.

Figure 2:
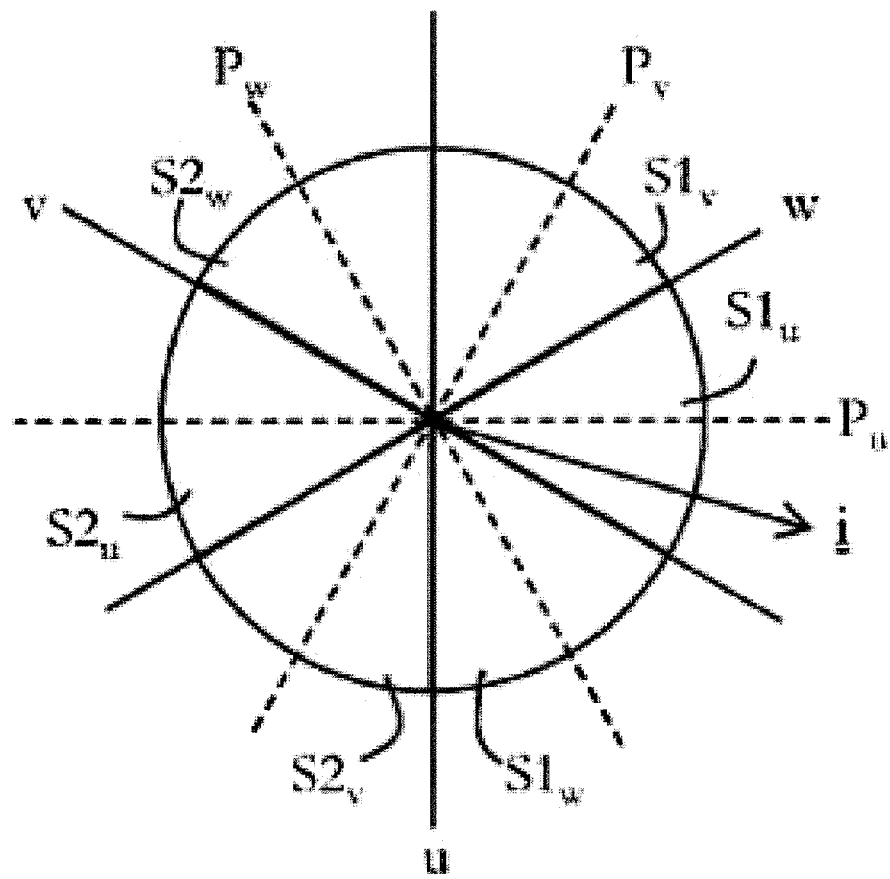

Accordingly, as the angle of the set point current vector i* is usually close to the measured angle of the current vector i, the phases u, v, w are disconnected over substantially the same angular sectors as shown in FIG. 2.

Third Embodiment

In a third embodiment, it is the cancellation of a phase current $i_u$, $i_v$, $i_w$ that is used to determine the phase u, v, w to be disconnected.

In this embodiment, the rotating machine 100 is identical to that from FIG. 1 except that the memory 112 does not contain associations between angular sectors and phases.

Figure 9:
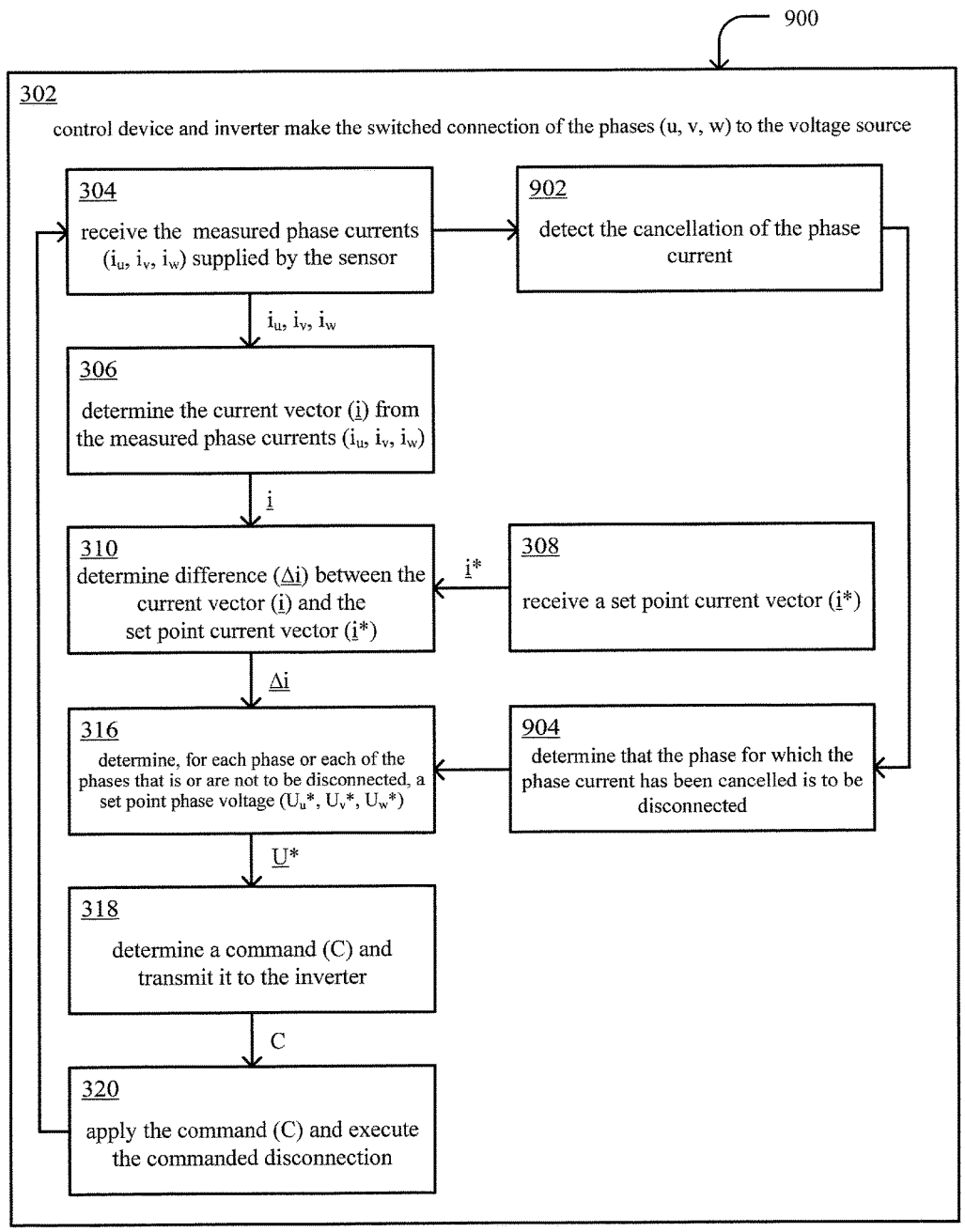

FIG. 9: Electrical Power Supply Method 900

Referring to FIG. 9, a method 900 of supplying electrical power to the electric motor 104 used in the third embodiment is described next.

The electrical power supply method 900 is identical to that from FIG. 3 except as follows.

The steps 312 and 314 are replaced by the following steps 902 and 904.

During a step 902, the control device 110 detects the cancellation of a phase current.

During step 904, the control device 110 determines that the phase for which the phase current has been cancelled is to be disconnected. If no phase current has been disconnected, then, during the step 904, the control device 110 determines that the last phase for which the phase current was cancelled is to be connected, i.e. to remain disconnected.

Accordingly, with this method for determining when to disconnect the phases, the latter are disconnected over substantially the same angular sectors as shown in FIG. 2.

Fourth Embodiment

In a fourth embodiment, it is the values of the phase currents relative to one another that are used to determine the phase to be disconnected.

In this embodiment, the rotating machine 100 is identical to that from FIG. 1 except that the memory 112 does not contain associations between angular sectors and phases.

Figure 10:
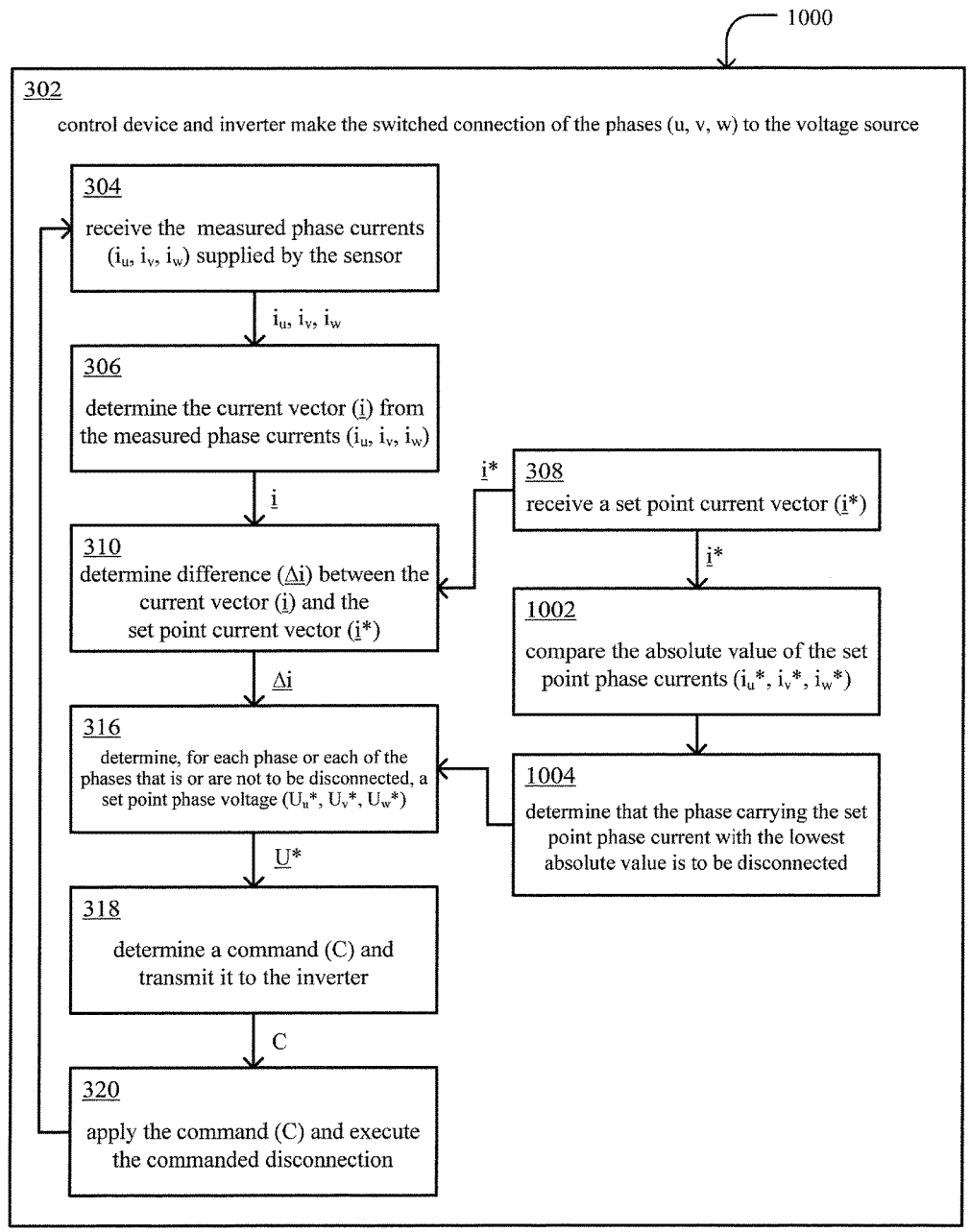

FIG. 10: Electrical Power Supply Method 1 000

Referring to FIG. 10, a method 1 000 of supplying electrical power to the electric motor 104 used in the third embodiment is described next.

The electrical power supply method 1 000 is identical to that from FIG. 3 except as follows.

The steps 312 and 314 are replaced by the following steps 1 002 and 1 004.

During a step 1 002, the control device 110 compares the absolute values of the set point phase currents $i_u$*, $i_v$*, $i_w$*. The set point phase currents are obtained for example by projecting the set point current vector i* onto the directions of the phases u, v, w.

During a step 1 004, the control device 110 determines that the phase carrying the set point phase current with the lowest absolute value is to be disconnected.

These two steps may be summarized by the following conditions: if $|i_u^*|<|i_v^*|$ and $|i_u^*|<|i_w^*|$, then the phase u is to be disconnected; if $|i_v^*|<|i_u^*|$ and $|i_v^*|<|i_w^*|$, then the phase v is to be disconnected; and if $|i_w^*|<|i_u^*|$ and $|i_w^*|<|i_v^*|$, then the phase w is to be disconnected.

Accordingly, with this method for determining when to disconnect the phases, the latter are disconnected over substantially the same angular sectors as shown in FIG. 2.

The invention is not limited to the embodiments described above, but to the contrary is defined by the appended claims, the scope of which encompasses all modifications and alternative configurations that may be derived from the general background knowledge of the person skilled in the art.

In particular, the electric motor could have more than three phases.

Moreover, the inverter could belong to a combined power supply and charging electrical device as described in the applications FR 2 938 711 and FR 2 944 391.

Moreover, the parts over which phases are disconnected could overlap, for example for multiphase systems including three or more phases.

Moreover, in the first embodiment, the phase currents could be obtained by means other than a sensor, for example by a device for estimating these currents, for example on the basis of the position of the rotor.

Moreover, the control device could include, instead of a computer program, dedicated electronic systems for executing the steps of the methods described.

Additionally, the angular sectors each preferably have an angle of at least 1° so that the disconnections have a notable effect.

The invention claimed is:

1. A method of supplying electrical power to an electric motor including phases having respective directions about a rotation axis of the electric motor and configured to carry respective phase currents defining a current vector starting from the rotation axis, the method comprising:
   switching connection of the phases to a voltage source so as to cause the current vector to turn,
   wherein the switched connection of the phases includes, during at least one turn of the current vector, for each of one or more phases:
      over a part of the turn, disconnecting the phase from the voltage source to open circuit the phase, and
      over another part of the turn, switching connection of the phase to the voltage source, and
   wherein a perpendicular to the direction of the phase passes through the part of the turn over which the phase is disconnected from the voltage source.

2. The method as claimed in claim 1, wherein the part of the turn over which the phase is disconnected from the voltage source comprises two separate sub-parts through each of which passes the perpendicular to the direction of the disconnectable phase.

3. The method as claimed in claim 1, wherein only one phase is disconnected to open circuit the one phase at a time.

4. A non-transitory computer readable media containing a computer program containing lines of code which, when executed by a computer, bring about the control by the computer of an inverter connecting an electric motor to a voltage source so as to implement a method as claimed in claim 1.

5. A method of supplying electrical power to an electric motor including phases having respective directions about a rotation axis of the electric motor and configured to carry respective phase currents defining a current vector starting from the rotation axis, the method comprising:
   switching connection of the phases to a voltage source so as to cause the current vector to turn;
   for disconnecting at least one phase over a part of a turn and for switchedly connecting this phase or each of the phases over the another part of the turn:
      reception of measurements of the phase currents,
      determination of the corresponding current vector belonging to the measured phase currents to at least one predetermined angular sector associated with a phase,
      disconnection of each phase associated with the predetermined angular sector or sectors to which the current vector belongs, and
      a switched connection of the other phase or phases,
   wherein the switched connection of the phases includes, during at least one turn of the current vector, for each of one or more phases:
      over a part of the turn, disconnecting the phase from the voltage source to open circuit the phase, and
      over another part of the turn, switching connection of the phase to the voltage source.

6. A method of supplying electrical power to an electric motor including phases having respective directions about a rotation axis of the electric motor and configured to carry respective phase currents defining a current vector starting from the rotation axis, the method comprising:
   switching connection of the phases to a voltage source so as to cause the current vector to turn,
   wherein the switched connection of the phases includes, during at least one turn of the current vector, for each of one or more phases:
      over a part of the turn, disconnecting the phase from the voltage source to open circuit the phase, and
      over another part of the turn, switching connection of the phase to the voltage source, and
   for disconnecting each of at least one phase over a part of a turn and for switchedly connecting this phase or each of these phases over the another part of the turn:
      reception of a set point current vector,
      determination of the set point current vector belonging to at least one predetermined angular sector associated with a phase,
      disconnection of each phase associated with the predetermined angular sector or sectors to which the set point current vector belongs, and
      a switched connection of the other phase or phases.

7. A method of supplying electrical power to an electric motor including phases having respective directions about a rotation axis of the electric motor and configured to carry respective phase currents defining a current vector starting from the rotation axis, the method comprising:
   switching connection of the phases to a voltage source so as to cause the current vector to turn;
   for disconnecting each of at least one phase over a part of a turn and for switchedly connecting this phase or each of these phases over the another part of the turn:
      measurement of the phase currents,
      detection of the cancellation or non-cancellation of a phase current,
      if a phase current has been cancelled, disconnection of the phase for which the phase current has been cancelled, if not the disconnection of the last phase for which the phase current was cancelled, and
      the switched connection of the other phase or phases to the voltage source
   wherein the switched connection of the phases includes, during at least one turn of the current vector, for each of one or more phases:
      over a part of the turn, disconnecting the phase from the voltage source to open circuit the phase, and
      over another part of the turn, switching connection of the phase to the voltage source.

8. A control device of an inverter connecting an electric motor to a voltage source, the electric motor including phases having respective directions about a rotation axis of the electric motor and configured to carry respective phase currents defining a current vector starting from the rotation axis, the control device being configured to control the inverter so that the latter effects a switched connection of the phases to the voltage source to cause the current vector to turn, wherein:
   the control device is further configured as follows, during at least one turn of the current vector, for each of one or more phases:
      over a part of the turn, to control the inverter so that the latter effects the disconnection of the phase from the voltage source to open circuit the phase,
      over another part of the turn, to control the inverter so that the latter effects the switched connection of the phase to the voltage source, and a perpendicular to the direction of the phase passes through the part of the turn over which the phase is disconnected from the voltage source.

9. A rotary electrical machine comprising:

an electric motor including phases having respective directions about a rotation axis of the electric motor and configured to carry respective phase currents defining a current vector starting from the rotation axis, a voltage source, an inverter adapted to connect the voltage source to the phases of the electric motor, a control device as claimed in claim 8.

* * * * *